United States Patent [19]

Date et al.

[11] 4,373,911

[45] Feb. 15, 1983

[54] APPARATUS FOR PREHEATING A STEEL SCRAP

[75] Inventors: Takasaburo Date, Yokohama; Toshimichi Maki, Tokyo; Mitsuya Iguchi, Himeji; Sumifusa Iwamaru, Himeji; Hisashi Watanabe, Himeji, all of Japan

[73] Assignees: Nippon Kokan Kabushiki Kaisha; Toshin Seiko Kabushiki Kaisha, both of Tokyo, Japan

[21] Appl. No.: 292,678

[22] Filed: Aug. 13, 1981

[30] Foreign Application Priority Data

Aug. 29, 1980 [JP] Japan .................. 55-122941[U]

[51] Int. Cl.³ .................. F27B 9/04; F27B 3/18; F27D 17/00; C21B 7/22
[52] U.S. Cl. .................. 432/152; 266/158; 432/162; 432/164; 432/179
[58] Field of Search .............. 432/152, 162, 164, 179; 373/80; 266/158, 901

[56] References Cited

U.S. PATENT DOCUMENTS

| | | | |
|---|---|---|---|
| 3,111,400 | 11/1963 | Hoff | 266/158 |
| 3,536,343 | 10/1970 | Casperson et al. | 266/901 |
| 3,852,028 | 12/1974 | Reinbold et al. | 266/901 |
| 4,278,421 | 7/1981 | Limque et al. | 432/152 |

Primary Examiner—John J. Camby

Attorney, Agent, or Firm—Frishauf, Holtz, Goodman & Woodward

[57] ABSTRACT

An apparatus for preheating steel scrap comprises: a preheating vessel, having an open top and a bottom lid capable of being opened and closed, for receiving and preheating steel scrap, said preheating vessel being adapted to receive steel scrap to be preheated from said open top and to discharge the steel scrap preheated in said preheating vessel by opening said bottom lid; a hood downwardly flaring for covering said open top of said preheating vessel, said hood being movable from said open top of said preheating vessel and adapted to introduce high-temperature waste gases discharged from a steel-refining metallurgical furnace into said preheating vessel; a pit for housing said preheating vessel, said pit being provided with a duct for discharging to the outside said waste gases discharged into said pit from the bottom of said preheating vessel after preheating said steel scrap received in said preheating vessel; and, a canopy for sealing the gap between said pit and said preheating vessel housed in said pit, the gap between the periphery of said canopy and said pit being liquid-sealed. The apparatus is characterized in that: said canopy is gas-tightly fixed to said hood; and, the gap between said canopy and said preheating vessel housed in said pit is sealed by an expansion bellows fixed at an end thereof to said canopy.

5 Claims, 2 Drawing Figures

APPARATUS FOR PREHEATING A STEEL SCRAP

FIELD OF THE INVENTION

The present invention relates to an apparatus for preheating steel scrap to a prescribed temperature with the use of high-temperature waste gases produced in a steel-refining metallurgical furnace, for example, an electric furnace when manufacturing steel from the steel scrap as a raw material in the steel-refining metallurgical furnace.

BACKGROUND OF THE INVENTION

There is known a method for preheating steel scrap to a prescribed temperature with the use of high-temperature waste gases produced in a steel-refining metallurgical furnace, for example, an electric furnace when manufacturing steel from the steel scrap as raw material in the steel-refining metallurgical furnace. According to this method, it is possible to reduce the refining time in the electric furnace, and thus save the electric power consumption required for refining.

FIG. 1 is a schematic sectional view illustrating an embodiment of the conventional apparatus for preheating steel scrap by the above-mentioned high-temperature waste gases. In FIG. 1, 1 is a preheating vessel for receiving and preheating a steel scrap, which vessel 1 has cylindrical drum portion 1b provided with an open top 1a, and a two-part bottom lid 2,2 which is movable by means of a suitable opening/closing device (not shown). This preheating vessel 1 is adapted to receive steel scrap to be preheated from the open top 1a thereof, and to discharge the preheated steel scrap by opening the bottom lid 2,2.

Also in FIG. 1, 7 is a hood downwardly flaring for covering the open top 1a of the preheating vessel 1. The top end of the hood 7 is provided with a waste-gas inlet 8 to which a blow pipe 9 of high-temperature waste gases is connected. The hood 7 is movable from the open top 1a of the preheating vessel 1, and is adapted to introduce the high-temperature waste gases into the preheating vessel 1.

In FIG. 1, 4 is a pit for housing the preheating vessel 1. The pit 4 is provided in the ground, and has a depth capable of containing substantially half the height of the preheating vessel 1; 10 is a duct opening at an end thereof to the lower part of the side wall of the pit 4, the other end of the duct 10 being connected to a chimney through a fan and a dust collector, and the waste gases after preheating the steel scrap contained in the preheating vessel 1 are discharged from the pit 4 through the duct 10; 5 are a plurality of stands installed on the bottom of the pit 4 for supporting the preheating vessel 1; and, 6 is a sealing water groove provided on the ground surrounding the pit 4.

In FIG. 1, 3 is a canopy provided along the outer peripheral wall surface of the drum portion 1b of the preheating vessel 1 substantially at the middle of the height of the drum portion 1b for sealing a gap between the pit 4 and the preheating vessel 1 placed in the pit 4. The outer peripheral edge of the canopy 3 is provided with a downwardly extending flange 3a which is inserted into the sealing water groove 6 when the preheating vessel 1 is placed into the pit 4, and thus the gap between the outer peripheral edge of the canopy 3 and the pit 4 is liquid-tightly sealed.

When preheating steel scrap in the conventional apparatus described above, the preheating vessel 1, containing the steel scrap to be preheated is placed on a plurality of stands installed on the bottom of the pit 4, and at the same time the flange 3a of the canopy 3 fixed to the drum portion 1b of the preheating vessel 1 is inserted into the sealing water groove 6. Thereafter, the open top 1a of the preheating vessel 1 is covered with the hood 7, and then, high-temperature waste gases are introduced from the hood 7 into the preheating vessel 1.

The high-temperature waste gases introduced from the hood 7 into the preheating vessel 1 pass through the preheating vessel 1 as shown by the arrows in FIG. 1 while preheating the steel scrap contained in the preheating vessel 1. The waste gases after thus preheating the steel scrap are discharged into the pit 4 through the juncture of the bottom lid 2,2 and a gap present in the contact portion between the bottom lid 2,2 and the drum portion 1b. Since the gap between the pit 4 and the preheating vessel 1 is sealed by the canopy 3 fixed to the drum portion 1b of the preheating vessel 1, the waste gases discharged into the pit 4 after preheating the steel scrap are totally withdrawn through the duct 10, and discharged to open air from the chimney through a dust collector.

The above-mentioned conventional apparatus is problematic in that, when covering the open top 1a of the preheating vessel 1 with the movable hood 7 for preheating steel scrap, gaps are produced in the contact portion between the open top 1a of the preheating vessel 1 and the hood 7, through which gaps the ambient air comes into the preheating vessel 1. Such gaps are caused by the insufficient shape accuracy and thermal deformation of the end surface of the open top 1a of the preheating vessel 1 and the inner peripheral surface of the hood 7 in contact with this end surface of the open top 1a, or caused by defectively attaching the hood 7 to the preheating vessel 1.

The ambient air coming into the preheating vessel 1 causes a temperature drop of the high-temperature waste gases blown from the hood 7 into the preheating vessel 1, thus resulting in an insufficient preheating of the steel scrap. Furthermore, if the ambient air comes into the preheating vessel 1, the amount of waste gases which must be withdrawn through the discharging duct 10 is increased by this air ingression, thus requiring installation of an unnecessarily large-capacity fan for sucking waste gases and an unnecessarily large-capacity dust collector for collecting dust from the waste gases.

Under such circumstances, there is a strong demand for the development of an apparatus for preheating steel scrap by introducing high-temperature waste gases discharged from a steel-refining metallurgical furnace into a preheating vessel containing steel scrap to be preheated, and preheating the steel scrap, in which apparatus the ambient air does not come into the preheating vessel and which apparatus permits efficient preheating of the steel scrap to a prescribed temperature. But such an apparatus is not as yet proposed.

SUMMARY OF THE INVENTION

A principal object of the present invention is therefore to provide an apparatus for preheating steel scrap by introducing high-temperature waste gases discharged from a steel-refining metallurgical furnace into a preheating vessel containing steel scrap to be preheated, and preheating the steel scrap, in which apparatus the ambient air does not come into the preheating vessel and which apparatus permits efficient preheating of the steel scrap to a prescribed temperature.

In accordance with one of the features of the present invention, there is provided an apparatus for preheating steel scrap, which comprises:

a preheating vessel, having an open top and a bottom lid capable of being opened and closed, for receiving and preheating steel scrap, said preheating vessel being adapted to receive steel scrap to be preheated from said open top and to discharge the steel scrap preheated in said preheating vessel by opening said bottom lid;

a hood downwardly flaring for covering said open top of said preheating vessel, said hood being movable from said open top of said preheating vessel and adapted to introduce high-temperature waste gases discharged from a steel-refining metallurgical furnace into said preheating vessel;

a pit for housing said preheating vessel, said pit being provided with a duct for discharging to the outside said waste gases discharged into said pit from the bottom of said preheating vessel after preheating said steel scrap received in said preheating vessel; and, a canopy for sealing the gap between said pit and said preheating vessel housed in said pit, the gap between the periphery of said canopy and said pit being liquid-sealed;

said apparatus being characterized in that:
said canopy is gas-tightly fixed to said hood; and,
the gap between said canopy and said preheating vessel housed in said pit is sealed by a sealing means such as an expansion bellows fixed at an end thereof to said canopy.

DETAILED DESCRIPTION OF THE PREFERRED EMBODIMENTS

With a view to solving the above-mentioned problems involved in the conventional apparatus for preheating steel scrap, we carried out extensive studies. As a result, we developed an apparatus for preheating steel scrap having the features defined in the appended claims and described in detail below.

Now, the apparatus for preheating steel scrap of the present invention (hereinafter referred to as the "preheating apparatus of the present invention") is described in detail with reference to the drawings.

Figure 1:
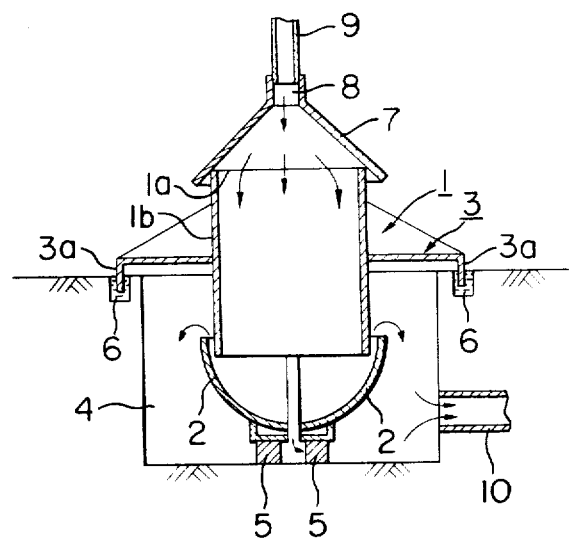
FIG. 1 is a schematic sectional view illustrating an embodiment of the conventional apparatus for preheating steel scrap; and, FIG. 2 is a schematic sectional view illustrating an embodiment of an apparatus for preheating steel scrap of the present invention.
Figure 2:
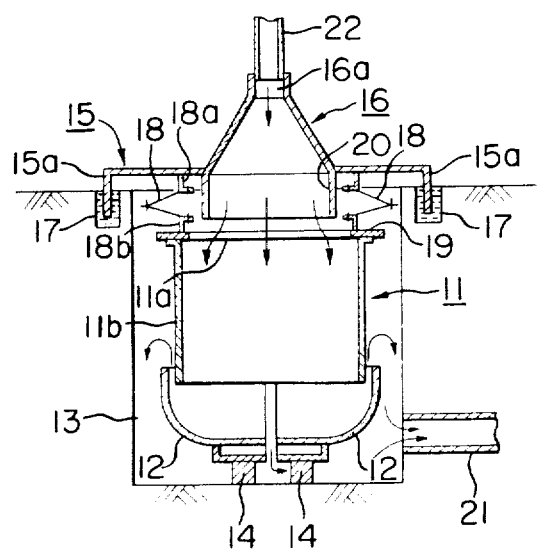

FIG. 2 is a schematic sectional view of the preheating apparatus of the present invention. In FIG. 2, 11 is a preheating vessel having a cylindrical drum portion 11b with an open top 11a and a two-part bottom lid 12,12 which is capable of being opened and closed by means of a suitable opening/closing device (not shown). The preheating vessel 11 is adapted to receive steel scrap to be preheated from the open top 11a thereof, and adapted to preheat the steel scrap by blowing high-temperature waste gases discharged from, for example, an electric furnace. This preheating vessel 11 is also adapted to discharge the preheated steel scrap by opening the bottom lid 12,12.

Also in FIG. 2, 16 is a hood which downwardly flares outwardly for covering the open top 11a of the preheating vessel 11. A waste-gas inlet 16a is provided on the top end of the hood 16, and a blow pipe 22 of high-temperature waste gases is connected to the waste-gas inlet 16a. The hood 16 is movable from the top of the preheating vessel 11, and is adapted to introduce high-temperature waste gases into the preheating vessel 11. 13 is a pit for housing the preheating vessel 11. The pit 13 is provided in the ground and has a volume capable of housing the entire preheating vessel 11. 21 is a duct of which an end opens to the lower part of the side wall of the pit 13. The other end of the duct 21 is connected to a chimney through a fan and a dust collector. The waste gases after preheating the steel scrap contained in the preheating vessel 11 are discharged to the outside of the pit 13 through the duct 21 from the pit 13 14 are a plurality of stands which are installed on the bottom of the pit 13 for supporting the preheating vessel 11. 17 is a sealing water groove provided in the ground surrounding the pit 13.

In FIG. 2, 15 is a canopy for sealing a gap between the pit 13 and the preheating vessel 11 housed in the pit 13. The canopy 15 is air-tightly fixed to the lower outer peripheral surface of the hood 16. A downwardly extending flange 15a is provided on the outer peripheral edge of the canopy 15. A gap between the outer peripheral edge of the canopy 15 and the pit 13 is liquid-tightly sealed by covering the pit 13 with the canopy 15 through the insertion of the flange 15a of the canopy 15 into the sealing water groove 17. In FIG. 2, 18 is an expansion bellows which serves as a sealing means for sealing a gap between the canopy 15 and the preheating vessel 11 housed in the pit 13. The bellows 18 is made of a heat-resistant material such as asbestos. An end of the bellows 18 is fixed to the lower surface of the canopy 15 through an annular fitting 18a. An annular metal plate 19 is fixed to the other end of the bellows 18 through an annular fitting 18b, and is capable of butt-contacting with the open top 11a of the preheating vessel 11. 20 is a protecting cylinder which is provided on the lower surface of the canopy 15 for protecting the bellows 18 from high-temperature waste gases containing dust.

When preheating steel scrap by the preheating apparatus of the present invention having a construction as described above, the preheating vessel 11 containing the steel scrap to be preheated is placed on the plurality of stands 14 which are installed on the bottom surface of the pit 13. Then, the canopy 15 to which the hood 16 is air-tightly connected is placed over the pit 13 by inserting the downwardly extending flange 15a into the sealing water groove 17, and at the same time the annular metal plate 19 at the lower end of the bellows 18 which is provided on the lower surface of the canopy 15 is brought into butt contact with the open top 11a of the preheating vessel 11. Thus, the gap between the outer peripheral edge of the canopy 15 and the pit 13 is liquid-tightly sealed by the sealing water groove 17, and the gap between the canopy 15 and the preheating vessel 11 housed in the pit 13 is sealed by the bellows 18. In order to cover the pit 13 with the canopy 15, it suffices to use, for example, a car which is movably installed over and across the sealing water groove 17 and vertically movably carries the canopy 15, and to position this car on the pit 13, then lower the canopy 15 downwardly to insert the downwardly extending flange 15a thereof into the sealing water groove 17, and hold the canopy 15 in this state.

Then, high-temperature waste gases are introduced into the preheating vessel 11 from the hood 16 connected with the blow pipe 22 of high-temperature waste gases. The high-temperature waste gases introduced from the hood 16 into the preheating vessel 11 pass through the preheating vessel 11 as indicated by the arrows in FIG. 2 while preheating the steel scrap contained in the preheating vessel 11. Thus, the waste gases after preheating the steel scrap are discharged into the pit 13 through the juncture in the bottom lid 12,12 and the gap in the contact portion between the bottom lid 12,12 and the drum portion 11b. Since the pit 13 is enclosed by the canopy 15, and the gap between the canopy 15 and the preheating vessel 11 housed in the pit 13 is sealed by the bellows 18 of which an end is fixed to the canopy 15, the ambient air never comes into the preheating vessel 11, and the high-temperature waste gas blown from the hood 16 is never discharged into the pit 13 without passing through the preheating vessel 11.

The waste gases discharged from the preheating vessel 11 into the pit 13 after preheating the steel scrap is taken out through a duct 21 of which an end opens into the lower part of the side wall of the pit 13, and is discharged via a dust collector and a chimney to open air. Since the pit 13 is sealed by the canopy 15, the ambient air never comes into the pit 13.

Upon the completion of preheating of the steel scrap charged in the preheating vessel 11 in this way, the canopy 15 covering the pit 13 is removed. The canopy 15 may be removed, for example, by raising the canopy 15 with the use of the above-mentioned car vertically movably carrying the canopy 15 for releasing the pit 13, and then transferring the car to a location far from the pit 13. The preheating vessel 11 is hoisted up by a crane from the pit 13 from which the canopy 15 has thus been removed, and then moved to the top of the electric furnace. The preheated steel scrap is charged into the electric furnace by opening the bottom lid 12,12 of the preheating vessel 11.

In the embodiment shown in FIG. 2, the pit 13 is provided in the ground. Instead of the pit 13, a cylindrical chamber capable of housing the preheating vessel 11 may be installed on the ground, or a semiunderground chamber may be provided for this purpose.

According to the preheating apparatus of the present invention, as described above in detail, it is possible, when introducing high-temperature waste gases discharged from a steel-refining metallurgical furnace into a preheating vessel containing steel scrap to be preheated, to efficiently preheat the steel scrap to a prescribed temperature, without causing ingression of the ambient air into the preheating vessel. Since the amount of waste gases after preheating the steel scrap never increases under the effect of the incoming ambient air, it is not necessary to install unnecessarily large-capacity installations of a fan for sucking the waste gases and a dust collector for collecting dust from the exhaust gases, thus providing industrially useful effects.

What is claimed is:

1. In an apparatus for preheating steel scrap, which comprises:

means defining a preheating vessel for receiving and preheating steel scrap, said preheating vessel having an open top and a bottom lid for said preheating vessel, said bottom lid being capable of being opened and closed, said preheating vessel being adapted to receive steel scrap to be preheated through said open top and to discharge the steel scrap preheated in said preheating vessel by opening said bottom lid;

means defining a downwardly and outwardly flaring hood for covering said open top of said preheating vessel, said hood being removable from said open top of said preheating vessel to permit introduction of high-temperature waste gases discharged from a steel-refining metallurgical furnace into said preheating vessel;

means defining a housing for containing said preheating vessel with a first gap between said housing and said preheating vessel, said preheating vessel including means for discharging waste gases from the bottom thereof into said housing, said housing comprising a duct for discharging to the outside said waste gases discharged into said housing from the bottom of said preheating vessel after preheating said steel scrap received in said preheating vessel; and means defining a canopy for sealing said first gap between said housing and said preheating vessel housed in said housing, a gap between the periphery of said canopy and said housing being liquid-sealed;

the improvement wherein:

said canopy is gas-tightly fixed to said hood;

a second gap is provided between said canopy and said preheating vessel housed in said housing; and a sealing means is coupled between said canopy and the upper portion of said preheating vessel for sealing said second gap between said canopy and said preheating vessel, said sealing means being fixed at an end thereof to said canopy.

2. The apparatus for preheating steel scrap of claim 1, wherein said sealing means for sealing said second gap between said canopy and said preheating vessel comprises an expansion bellows coupled between said canopy and said preheating vessel.

3. The apparatus for preheating steel scrap of claim 1 or 2, wherein said means defining said housing comprises a recessed pit.

4. The apparatus for preheating steel scrap of claim 1 or 2, wherein said canopy has a lower end, and includes a protecting cylindrical extension on said lower end of said canopy, said protecting cylindrical extension extending interior of said sealing means for protecting said sealing means from high-temperature waste gases through said hood to said preheating vessel.

5. The apparatus for preheating steel scrap of claim 1 or 2, wherein said sealing means has an other end, and further comprising an annular sealing plate fixed to said other end of said sealing means for butt-contacting with the open top of said preheating vessel.

* * * * *